United States Patent [19]

Lee et al.

[11] 3,887,546

[45] June 3, 1975

[54] 1-AMINO SUBSTITUTED 1-CYCLOALKANE DERIVATIVES OF 7-AMINOCEPHALOSPORANIC ACID AND 7-AMINODESACETOXY CEPHALOSPORANIC ACID

[75] Inventors: Bong Kuk Lee, Old Bridge; Saul Lewis Neidleman, Trenton, both of N.J.; Dewey D. Y. Ryu, Holliston, Mass.

[73] Assignee: E. R. Squibb & Sons, Inc., Princeton, N.J.

[22] Filed: Aug. 21, 1972

[21] Appl. No.: 282,097

[52] U.S. Cl............ 260/240 G; 260/243 C; 424/246
[51] Int. Cl............................................. C07d 99/24
[58] Field of Search.............. 260/243 C; 260/240 G

[56] References Cited
UNITED STATES PATENTS

| | | | |
|---|---|---|---|
| 3,592,812 | 7/1971 | Alburn et al. | 260/243 C |
| 3,634,417 | 1/1972 | Attenburrow | 260/243 C |
| 3,647,781 | 3/1972 | Wiesvogle et al. | 260/243 C |

FOREIGN PATENTS OR APPLICATIONS

| | | | |
|---|---|---|---|
| 748,419 | 12/1966 | Canada | 260/239.1 |

Primary Examiner—Nicholas S. Rizzo
Attorney, Agent, or Firm—Lawrence S. Levinson; Merle J. Smith; Stephen B. Davis

[57] ABSTRACT

Disclosed herein are novel compounds of the formula

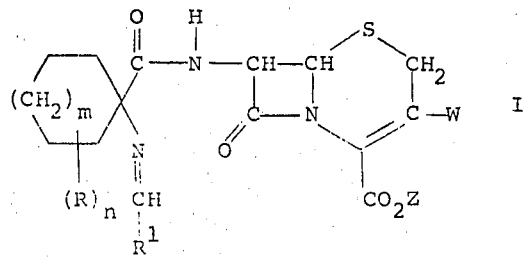

and

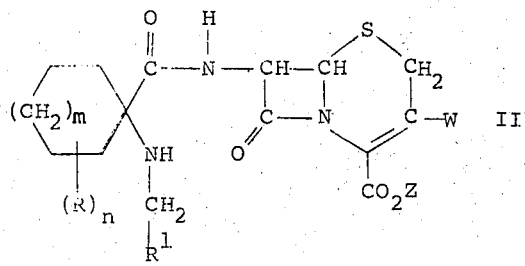

wherein W is $-CH_3$ or $-CH_2OCOCH_3$, $m$ is 0, 1 or 2; R is alkyl of from 1 to 7 carbon atoms, hydroxy or halogen; $n$ is 0, 1, 2 or 3; $R^1$ is phenyl, naphthyl, substituted phenyl or naphthyl wherein the substituent is halogen, hydroxy, or alkyl, alkoxy or acyl, each of from 1 to 4 carbon atoms, or amido; and Z is hydrogen, alkyl of from 1 to 7 carbon atoms or a salt forming ion. These compounds, prepared by condensing a Schiff's base of a 1-amino-1-cycloalkane carboxylic acid with 7-ACA or 7-ADCA, are useful as antibacterial agents.

8 Claims, No Drawings

1-AMINO SUBSTITUTED 1-CYCLOALKANE DERIVATIVES OF 7-AMINOCEPHALOSPORANIC ACID AND 7-AMINODESACETOXY CEPHALOSPORANIC ACID

DETAILED DESCRIPTION

This invention relates to new derivatives of 7-aminocephalosporanic acid (7-ACA) or 7-aminodesacetoxycephalosporanic acid (7-ADCA) of the formula

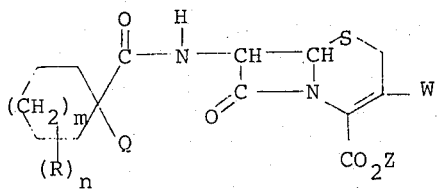

wherein $m$ is 0, 1 or 2; Q is $-N=CHR^1$ or $-NH-CH_2-R^1$ wherein $R^1$ is alkyl of from 1 to 7 carbon atoms (methyl, ethyl, propyl, i-propyl, n-butyl, i-butyl, t-butyl, pentyl, 2-methylbutyl, neopentyl, hexyl, 2-methylpentyl, 3-methylpentyl, 2,2-dimethylbutyl, 2,3-dimethylbutyl, heptyl, 2-methylhexyl, 3-methylhexyl, 2,2-dimethylpentyl, 2,3-dimethylpentyl, 2,4-dimethylpentyl, 3,3-dimethylpentyl, 3-ethylpentyl, or 2,2,3-trimethylbutyl), cycloalkyl of from 5 to 7 carbon atoms (cyclopentyl, cyclohexyl, cycloheptyl, methylcyclopentyl, 1,1-dimethylcyclopentyl or methylcyclohexyl), phenyl, naphthyl, substituted phenyl or naphthyl, preferably ortho, wherein the substituent is halogen (F, Cl, Br or I), hydroxy, alkyl of from 1 to 4 carbon atoms (methyl, ethyl, propyl, i-propyl, butyl, i-butyl, or t-butyl), alkoxy of from 1 to 4 carbon atoms (methoxy, ethoxy, propoxy, i-propoxy, butoxy, i-butoxy or t-butoxy), acyl of from 1 to 4 carbons (formyl, acetyl, propionyl, i-propionyl, butanoyl, or 2-methylpropionyl), or amido; R is alkyl of from 1 to 7 carbon atoms (methyl, ethyl, propyl, i-propyl, n-butyl, i-butyl, t-butyl, pentyl, 2-methylbutyl, neopentyl, hexyl, 2-methylpentyl, 3-methylpentyl, 2,2-dimethylbutyl, 2,3-dimethylbutyl, heptyl, 2-methylhexyl, 3-methylhexyl, 2,2-dimethylpentyl, 2,3-dimethylpentyl, 2,4-dimethylpentyl, 3,3-dimethylpentyl, 3-ethylpentyl, or 2,2,3-trimethylbutyl), hydroxy or halogen (F, Cl, Br or I); $n$ is 0, 1, 2 or 3; Z is hydrogen, alkyl of from 1 to 7 carbon atoms (methyl, ethyl, propyl, i-propyl, n-butyl, i-butyl, t-butyl, pentyl, 2-methylbutyl, neopentyl, hexyl, 2-methylpentyl, 3-methylpentyl, 2,2-dimethylbutyl, 2,3-dimethylbutyl, heptyl, 2-methylhexyl, 3-methylhexyl, 2,2-dimethylpentyl, 2,3-dimethylpentyl, 2,4-dimethylpentyl, 3,3-dimethylpentyl, 3-ethylpentyl, or 2,2,3-trimethylbutyl) or a salt forming ion (an alkali metal, e.g., Na or K, an alkaline earth metal, e.g., Ca or Mg, or an organic base, e.g., dibenzylamine or N,N-dibenzylethylenediamine), and W is $-CH_3$ or $CH_2OCOCH_3$. Also included in the scope of the present invention are the optical antipodes of the foregoing compounds which are optically active.

The compounds I and II of the present invention are prepared by condensing 7-ACA or 7-ADCA or a salt thereof under known conditions with an acid or acyl halide of the formula

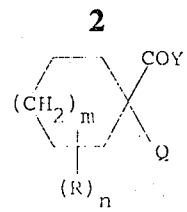

wherein $m$, R, $n$ and Q are as previously defined and Y is OH, Cl or Br.

The temperature at which the condensation reaction is carried out is not critical. However, the process of the present invention may conveniently be carried out at a temperature of from about $-25°$ to about $50°$, preferably from about $-10°$ to about $30°$. It is further desired that the reaction environment not be too strongly alkaline or acidic (e.g., between pH 3 and pH 9 is preferred). Organic solvents, especially those which are inert to the reactants and condensation agents which may be present, are suitable as the reaction medium. Such solvents are, for example, acetone, chlorinated hydrocarbons such as methylene chloride or chloroform; ethers such as tetrahydrofuran or dioxane; or dimethylformamide.

The compounds I of the present invention may also be prepared by reacting under known conditions a compound of formula IV (wherein Y is OH and Q is $-N=CHR^1$) with an acyl halide of the formula

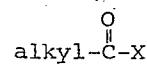

wherein X is Cl or Br to form a mixed anhydride of the formula

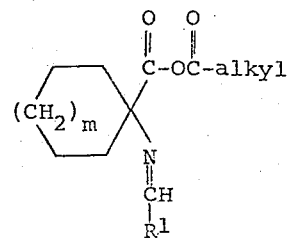

which mixed anhydride is then reacted with 7-ACA or 7-ADCA. The reaction of the compound of formula IV with the acyl halide is carried out in a mixture of solvents such as acetone, dioxane and lutidine at temperatures ranging from about $-10°$ to about $20°$, preferably from about $-10°$ to about $10°$, employing a molar ratio of acyl halide to compound of formula IV within the range of from about 1:1 to about 3:1, preferably 1.1:1 to 1.5:1.

The reaction of the mixed anhydride with 7-ACA or 7-ADCA is carried out in an aqueous solvent such as aqueous sodium bicarbonate at a temperature with the range of from about $-15°$ to about $5°$ and preferably from about $-5°$ to about $0°$ employing a molar ratio of mixed anhydride to 7-ACA or 7-ADCA within the range of from about 1:0.8 to about 2:1, preferably from about 1.1:1 to about 1.5:1.

The compounds II of the present invention can be prepared by reacting a compound of formula I with a reducing agent such as sodium boronydride, aluminum boronydride, lithium aluminum hydride, or hydrogen in conjunction with a catalyst for reduction such as platinum or palladium.

This reduction can be carried out in water or aqueous solvents, such as aqueous potassium phosphate, at temperatures ranging from about 0° to about 40° and preferably from about 10° to about 20° employing a molar ratio of a compound of formula I to reducing agent within the range of from about 1:2 about 1:10, preferably from about 1:4 to about 1:6.

Alternatively, the formula II compounds can be prepared by forming compounds of formula IV wherein Q is —N=CHR[1], reducing this compound by reacting it with any of the aforementioned reducing agents to form a compound of the formula

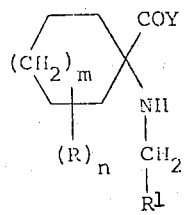

which compound is then reacted under conditions previously described with an acyl halide of the formula

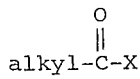

wherein X is Cl or Br to form a mixed anhydride which is then reacted with 7-ACA or 7-ADCA.

The compound of formula IV is prepared by condensing a 1-amino-1-cycloalkane carboxylic acid or a substituted 1-amino-1-cycloalkane carboxylic acid with an aldehyde of the formula

wherein R[1] is as previously defined. This condensation is preferably carried out in the presence of an aqueous-alcoholic solvent, such as a mixture of water and methanol, at temperatures ranging from ambient temperature to the boiling point of the solvent. The 1-amino-1-cycloalkane carboxylic acid compound can be employed in a molar ratio to the aldehyde of from about 1:1 to about 1:3, and preferably from about 1:1 to about 1:1.5.

The novel compounds of the present invention are biologically active and have been found to possess antibacterial activity both against gram-positive and gram-negative causative organisms. AS indicated, they are useful antimicrobial agents and have high antimicrobial activity in vitro against standard laboratory microorganism used to screen for activity against pathogens.

The compounds of the present invention can be used as therapeutics and disinfectants. Accordingly, they can be used in the form of pharmaceutical preparations which contain them or their salts in admixture with a pharmaceutical, organic or inorganic inert carrier material which are suitable for enteral, percutaneous or parenteral application. Suitable carrier materials include, for example, water, gelatin, gum arabic, lactose, starches, magnesium stearate, talc, vegetable oils, polyalkyleneglycols, petroleum jelly, etc. The pharmaceutical preparations can be submitted in solid form (e.g., as tablets, dragees, suppositories, capsules); in semi-solid form (e.g., as salves) or in liquid form (e.g., as solutions, suspensions or emulsions). They may be sterilized and/or contain additives such as preserving, stabilizing, wetting or emulsifying agents, salts for varying the osmotic pressure or buffers. The aforesaid preparations may further be compounded with other therapeutically valuable substances such as other compounds having antibacterial activity.

The compounds of the invention can be administered with dosage adjusted to pharmacological needs. Dosages can be given as a single unit dosage form or in divided dosage units. For oral administration, dosage units containing from about 100 mg to 400 mg of the compounds of the present invention can be used. When parenteral administration is employed, dosage units containing from about 200 mg to 300 mg of the compounds of the invention can be used. Daily dosages of from about 10 mg/kg of body weight to about 40 mg/kg of body weight can be used when the compounds of the invention are administered orally and when administered parenterally, daily dosages of from 10 mg/kg to about 25 mg/kg of body weight can be used. These dosage figures are in no way critical and should, of course, be adjusted according to the best judgment of the person administering the compound and depending on the result desired and the reason for which the compound is being administered.

The symbol Z also includes as organic bases the ammonium salt and substituted ammonium salts, e.g., salts of such nontoxic amines as trialkylamines, including triethylamine, procaine, dibenzylamine, N-benzyl-β-phenethylamine, N,N'-dibenzylethylenediamine, N-(lower)alkylpiperidine, alkylpiperidine, e.g., N-ethylpiperidine and other amines which have been used to form salts with benzylpenicillin and the like.

Examples of aldehydes which can be employed herein as starting materials include, but are not limited to, the following

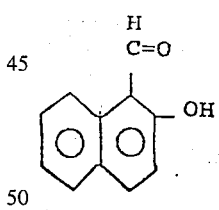

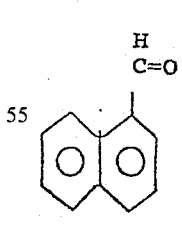

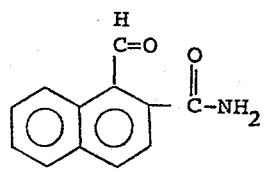

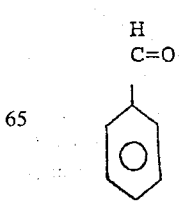

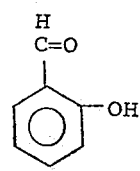

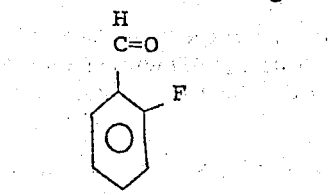
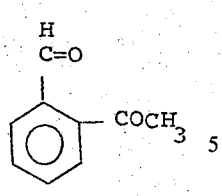
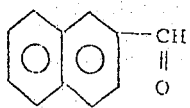
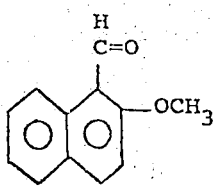
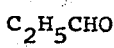
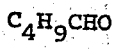
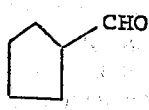
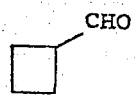
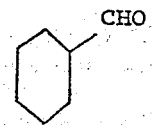

The following examples are illustrative of the invention, all temperatures being in degrees Celsius unless otherwise stated. All temperatures given heretofore are also in degrees Celsius.

EXAMPLE 1

7-[[1-[[(2-Hydroxy-1-naphthyl)methylene]amino]cyclopent-1-yl]-carboxamido]cephalosporanic acid, sodium salt, hydrate 5.16 g (40 millimoles) of 1-amino-1-cyclopentanecarboxylic acid and 3.36 g (40 millimoles) of $NaHCO_3$ are dissolved in a hot mixture of 30 ml water and 170 ml methanol. 13.76 g (80 millimoles) of 2-hydroxy-1-naphthaldehyde are added to the solution. The resulting clear brownish solution is refluxed for 3 hours. The reaction mixture is then concentrated on a flash evaporator, the dry concentrate washed with ether until the ether washing become clear, and a greenish-yellow product obtained. The product weighs 10.8 g.

2.02 g (6.63 millimoles) of this product is suspended in a mixture of 60 ml acetone and 1 ml lutidine, the suspension cooled in an ice bath, 0.48 ml (8 millimoles) of ethyl chloroformate added, and the reaction mixture stirred in an ice bath for 10 minutes. 1.296 g (6 millimoles) of 7-aminocephalosporanic acid (7-ACA) is dissolved in a cold mixture of 20 ml water and 2 ml triethylamine, the mixed anhydride formed as above cooled in dry ice bath, the 7-ACA solution added in one portion to the suspension of mixed anhydride, and reaction for the condensation carried out for ½ hour in an ice bath and for another ½ hour at room temperature. The resultant reaction mixture is flash evaporated at 20°C to remove acetone, the remaining aqueous suspension extracted 3 times with 70 ml portions of ether, the aqueous layer acidified to pH 2 with 1N HCl and extracted 3 times with 70 ml portions of ether. The ether extracts are washed with 10 ml of water, the washed ether extracts extracted with 10 ml of 3% $NaHCO_3$ solution, and the $NaHCO_3$ extract (pH 7.2) lyophilized. The crude product weighs 584 mg. For preparation of an analytical sample, 100 mg of the crude product is extracted with cold ethyl acetate, a small portion of water added to the ethyl acetate extract, ethyl acetate removed on a flash evaporator at 10°C, and the remaining aqueous solution lyophilized to yield 32 mg of solid purified product. Its analytical data are:

Emp. formula: $C_{26}H_{24}N_3SO_7Na$

EXAMPLE 2

7-[[1-[[(2-Hydroxyphenyl)methylene]amino]cyclopent-1-yl]-carboxamido]cephalosporanic acid, sodium salt By utilizing 2-hydroxybenzaldehyde in lieu of 2-hydroxy-1-naphthaldehyde and following the procedures set forth in Example 1, the desired product is recovered.

EXAMPLE 3

7-[[1-[[(2-Hydroxy-1-naphthyl)methylene]amino]-2-ethylcyclopent-1-yl]carboxamido]cephalosporanic acid, sodium salt, hydrate By utilizing 1-amino-1-(2-ethylcyclopentane)carboxylic acid in lieu of 1-amino-1-cyclopentanecarboxylic acid and following the procedures set forth in Example 1, the desired product is recovered.

EXAMPLE 4

7-[[1-[[(2-Hydroxy-1-naphthyl)methylene]amino]-2,4-dibutylcyclopent-1-yl]carboxamido]cephalosporanic acid, sodium salt, hydrate By utilizing 1-amino-1-(2,4-dibutylcyclopentane)carboxylic acid in lieu of 1-amino-1-cyclopentanecarboxylic acid and following the procedures set forth in Example 1, the desired product is recovered.

EXAMPLE 5

7-[[1-[[(2-Ethoxyphenyl)methylene]amino]cyclopent-1-yl]-carboxamido]cephalosporanic acid, sodium salt By utilizing 2-ethoxybenzaldehyde in lieu of 2-hydroxy-1-naphthaldehyde and following the procedures set forth in Example 1, the desired product is recovered.

EXAMPLE 6

7-[[1-[[(2-Butylphenyl)methylene]amino]cyclopent-1-yl]-carboxamido]cephalosporanic acid, sodium salt By utilizing 2butylbenzaldehyde in lieu of 2-hydroxy-1-naphthaldehyde and following te procedures set forth in Example 1, the desired product is recovered.

EXAMPLE 7

7-[[1-[[(4-Hydroxyphenyl)methylene]amino]cyclopent-1-yl]-carboxamido]cephalosporanic acid, sodium salt By utilizing 4-hydroxybenzaldehyde in lieu of 2-hydroxy-1-naphthaldehyde and following the procedures set forth in Example 1, the desired product is recovered.

EXAMPLE 8

7-[[1-[[(3-Isopropoxyphenyl)methylene]amino]cyclopent-1-yl]-carboxamido]cephalosporanic acid, sodium salt By utilizing 3-isopropoxybenzaldehhyde in lieu of 2-hydroxy-1-naphthaldehyde and following the procedures set forth in Example 1, the desired product is recovered.

EXAMPLE 9

7-[[1-[[(4-Hexylphenyl)methylene]amino]cyclopent-1-yl]-carboxamido]cephalosporanic acid, sodium salt By utilizing 4-hexylbenzaldehyde in lieu of 2-hydroxy-1-naphthaldehyde and following the procedures set forth in Example 1, the desired product is recovered.

EXAMPLE 10

7-[[1-[[(2-Butoxynaphthyl)methylene]amino]cyclopent-1-yl]-carboxamido]cephalosporanic acid, sodium salt By utilizing 2-butoxy-1-naphthaldehyde in lieu of 2-hydroxy-1-naphthaldehyde and following the procedures set forth in Example 1, the desired product is recovered.

EXAMPLE 11

7-[[1-[[(4-Pentyl-1-naphthyl)methylene]amino]cyclopent-1-yl]carboxamido]cephalosporanic acid, sodium salt By utilizing 4-pentyl-1-naphthaldehyde in lieu of 2-hydroxy-1-naphthaldehyde and following the procedures set forth in Example 1, the desired product is recovered.

EXAMPLE 12

7-[[1-[[(6-Isopropoxy-1-naphthly)methylene]amino]cyclopent-1-yl]carboxamido]cephalosporanic acid, sodium salt By utilizing 6-isopropoxy-1-naphthaldehyde in lieu of 2-hydroxy-1-naphthaldehyde and following the procedures set forth in Example 1, the desired product is recovered.

EXAMPLE 13

7-[[1-[[(5-Hydroxy-1-naphthyl)methylene]amino]cyclopent-1-yl]carboxamido]cephalosporanic acid, sodium salt By utilizing 5-hydroxy-1-naphthaldehyde in lieu of 2-hydroxy-1-naphthaldehyde and following the procedures set forth in Example 1, the desired product is recovered.

EXAMPLE 14

7-[[1-[[(2,6-Dibutyl-1-naphthyl)methylene]amino]cyclopent-1-yl]carboxamido]cephalosporanic acid, sodium salt By utilizing 2,6-dibutyl-1-naphthaldehyde in lieu of 2-hydroxy-1-naphthaldehyde and following the procedures set forth in Example 1, the desired product is recovered.

EXAMPLE 15

7-[[1-[[(2-Hydroxy-1-naphthyl)methyl]amino]cyclopent-1-yl]-carboxamido]cephalosporanic acid, hydrate The product of Example 1 (0.92 millimoles) is dissolved in 300 ml of potassium phosphate buffer (0.5 M, pH 6), and to this solution is added 163 mg (427 millimoles) of $NaBH_4$ dissolved in 15 ml $H_2O$, dropwise, for 3 hours, with stirring, at a temperature of about 10°C. The reaction mixture is acidified to pH 3 in an ice bath, and centrifuged to separate a solid product. After washing the solid twice with 5 ml portions of cold water, it is dried in vacuo.

Emp. formula: $C_{26}H_{27}N_3SO_7$ (m.p. 233°–238°).

EXAMPLE 16

7-[[1-[[(2-hydroxy-1-naphthyl)methylene]amino]cyclohex-1-yl]-carboxamido]cephalosporanic acid, sodium salt, hydrate The title compound is obtained following the procedure of Example 1 but substituting 5.72 g of 1-amino-1-cyclohexane carboxylic acid for 1-amino-1-cyclopentane carboxylic acid.

EXAMPLE 17

7-[[1-[[(2-Hydroxy-1-naphthyl)methylene]amino]cyclopent-1-yl]-carboxamido]desacetoxycephalosporanic acid, sodium salt, hydrate The title compound is obtained following the procedure of Example 1 but substituting 6 millimoles of 7-ADCA for 7-ACA.

Emp. formula: $C_{25}H_{24}N_3SO_5Na$

EXAMPLE 18

7-[[1-[[(2-Hydroxyphenyl)methyl]amino]cyclopent-1-yl]carboxamido]desacetoxycephalosporanic acid, hydrate The title compound is obtained following the procedure of Example 15 but substituting 80 millimoles of 2-hydroxybenzaldehyde for 2-hydroxy-1-naphthaldehyde, and substituting 6 millimoles of 7-ADCA for 7-ACA in the procedure of Example 1.

Emp. formula: $C_{25}H_{27}N_3SO_5$ (m.p. 241°–245°).

EXAMPLE 19

7-[[1-[[(2-Hydroxyphenyl)methyl]amino]cyclohept-1-yl]carboxamido]desacetoxycephalosporanic acid, hydrate The title compound is obtained following the procedure of Example 18 but substituting 6.28 g of 1-amino-1-cycloheptane carboxylic acid for 1-amino-1-cyclopentane carboxylic acid.

EXAMPLE 20

7-[[1-[[(2-Ethoxyphenyl)methyl]amino]cyclohex-1-yl]carboxamido]desacetoxycephalosporanic acid, hydrate The title compound is obtained following the procedure of Example 1 but substituting 5.72 g of 1-amino-1-cyclohexane carboxylic acid for 1-amino-1-cyclopentane carboxylic acid, and substituting 80 millimoles of 2-ethoxybenzaldehyde for 2-hydroxy-1-naphthaldehyde, and treating the resulting 7-[[1-[[(2-ethoxyphenyl)-methylene]amino]cyclohex-1-yl]carboxamido]cephalosporanic acid, sodium salt, hydrate, according to the procedure of Example 15.

EXAMPLE 21

7-[[1-[[(2-Ethoxyphenyl)methyl]amino]cyclohex-1-yl]carboxamido]desacetoxycephalosporanic acid, sodium salt, hydrate The title compound is obtained following the procedure of Example 20 but substituting 6 millimoles of 7-ADCA for 7-ACA.

EXAMPLES 22–24

Following the procedure of Example 1 but substituting for 1-amino-1-cyclopentane carboxylic acid 40 millimoles of the compound listed in Column I, there is obtained the corresponding 7-[[1-[[(2-hydroxy-1-naphthyl)methylene]amino]cycloalk-1-yl]carboxamido]cephalosporanic acid, sodium salt, hydrate, wherein the cycloalk-1-yl radical is as indicated in Column II.

| Example | I | II |
|---|---|---|
| 22 | 1-amino-2-hydroxycyclohexane carboxylic acid | 2-hydroxycyclohex-1-yl |
| 23 | 1-amino-2-ethylcycloheptane carboxylic acid | 2-ethylcyclohept-1-yl |
| 24 | 1-amino-3-fluorocyclohexane carboxylic acid | 3-fluorocyclohex-1-yl |

EXAMPLES 25–27

Following the procedure of Example 1 but substituting for 1-amino-1-cyclopentane carboxylic acid 40 millimoles of the compound listed in Column I, and substituting 6-millimoles of 7-ADCA for 7-ACA there is obtained the corresponding 7-[[1-[[(2-hydroxy-1-naphthyl)methylene]amino]cycloalk-1-yl]-carboxamido]desacetoxycephalosporanic acid, sodium salt, hydrate, wherein the cycloalk-1-yl radical is as indicated in Column II.

| Example | I | II |
|---|---|---|
| 25 | 1-amino-2-hydroxycyclohexane carboxylic acid | 2-hydroxycyclohex-1-yl |
| 26 | 1-amino-2-ethylcycloheptane carboxylic acid | 2-ethylcyclohept-1-yl |
| 27 | 1-amino-3-fluorocyclohexane carboxylic acid | 3-fluorocyclohex-1-yl |

EXAMPLES 28–33

Following the procedure of Example 15 but substituting as starting material, respectively, the final product of Examples 22–27, there is obtained the corresponding reduced compound of Formula II.

EXAMPLES 34–37

Following the procedure of Example 1 but substituting for 2-hydroxy-1-naphthaldehyde 80 millimoles of the aldehyde listed in Column I, there is obtained the corresponding compound of Formula I wherein $m$ and $n$ are O, Z is Na and $R^1$ is as indicated in Column II.

| Example | I | II |
|---|---|---|
| 34 | 2-fluorobenzaldehyde | 2-fluorophenyl |
| 35 | 4-chlorobenzaldehyde | 4-chlorophenyl |
| 36 | 2-amidonaphthaldehyde | 2-amidonaphthyl |
| 37 | 2-acetylbenzaldehyde | 2-acetylphenyl |

EXAMPLES 38–41

Following the procedure of Example 1 but substituting for 2-hydroxy-1-naphthaldehyde 80 millimoles of the aldehyde listed in Column I, and substituting 6-millimoles of 7-ADCA for 7-ACA there is obtained the corresponding 7-[[1-[[(substituted aryl)methylene]amino]cycloalk-1-yl]carboxamido]-desacetoxycephalosporanic acid, sodium salt, hydrate, compound of formula I wherein m and n are O, Z is Na and R¹ is as indicated in Column II.

| Example | I | II |
|---|---|---|
| 38 | 2-fluorobenzaldehyde | (2-fluorophenyl) |
| 39 | 4-chlorobenzaldehyde | (4-chlorophenyl) |
| 40 | 2-amidonaphthaldehyde | (2-amidonaphthyl) |
| 41 | 2-acetylbenzaldehyde | (2-acetylphenyl) |

EXAMPLES 42–49

Following the procedure of Example 15 but employing as starting material, respectively, the final product of Examples 34–41, there is obtained the corresponding reduced compound of Formula II.

EXAMPLES 50–52

Following the procedure of Example 15 but substituting for 1-amino-1-cyclopentanecarboxylic acid 40 millimoles of the compound listed in Column I, there is obtained the corresponding 7-[[1-[[(2-hydroxy-1-naphthyl)methyl]amino]-cycloalk-1-yl]carboxamido]cephalosporanic acid, sodium salt, hydrate, wherein the cycloalk-1-yl radical is as indicated in Column II.

| Example | I | II |
|---|---|---|
| 50 | 1-amino-3-bromocyclohexane carboxylic acid | 3-bromocyclohex-1-yl |
| 51 | 1-amino-3-methyl-4-hydroxy-cyclohexane carboxylic acid | 3-methyl-4-hydroxycyclohex-1-yl |
| 52 | 1-amino-2-propyl-3-chloro-cyclopentane carboxylic acid | 2-propyl-3-chlorocyclopent-1-yl |

EXAMPLES 52–54

Following the procedure of Example 15 but substituting for 1-amino-1-cyclopentanecarboxylic acid 40 millimoles of the compound listed in Column I, and substituting 6-millimoles of 7-ADCA for 7-ACA, there is obtained the corresponding 7-[[1-[[(2-hydroxy-1-naphthyl)methyl]amino]cycloalk-1-yl]-carboxamido]desacetoxycephalosporanic acid, sodium salt, hydrate, wherein the cycloalk-1-yl radical is as indicated in Column II.

| Example | I | II |
|---|---|---|
| 52 | 1-amino-3-bromocyclohexane carboxylic acid | 3-bromocyclohex-1-yl |
| 53 | 1-amino-3-methyl-4-hydroxy-cyclohexane carboxylic acid | 3-methyl-4-hydroxycyclohex-1-yl |
| 54 | 1-amino-2-propyl-3-chloro-cyclopentane carboxylic acid | 2-propyl-3-chlorocyclopent-1-yl |

EXAMPLES 55–60

Following the procedure of Example 15 but employing as starting material, respectively, the final product of Examples 50–54, there is obtained the corresponding reduced compound of Formula II.

What is claimed is:

1. A compound of the formula

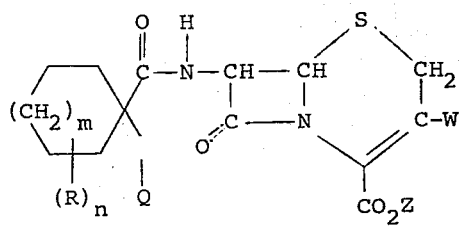

wherein m is 0, 1 or 2; R is alkyl of from 1 to 7 carbon atoms, hydroxy or halogen; n is 0, 1, 2, or 3; Q is —N=CHR¹—NHCH$_2$R¹ wherein R¹ is phenyl, naphthyl, or substituted phenyl or naphthyl wherein the substituent is halogen, hydroxy, alkyl of from 1 to 4 carbon atoms, alkoxy of from 1 to 4 carbon atoms, or acyl of from 1 to 4 carbon atoms, or amido; W is —CH$_3$ or —CH$_2$OCOCH$_3$; and Z is hydrogen, alkyl of from 1 to 7 carbon atoms, a physiologically acceptable alkali metal or alkaline earth metal, or a physiologically acceptable organic base.

2. A compound of claim 1 wherein Q is —N=CHR¹ and W is —CH$_3$.

3. A compound of claim 1 wherein Q is —NHCH$_2$R¹ and W is —CH$_3$.

4. A compound of claim 1 wherein Q is —N=CHR¹ and W is —CH$_2$OCOCH$_3$.

5. A compound of claim 1 wherein Q is —NHCH$_2$R¹ and W is —CH$_2$OCOCH$_3$.

6. A compound according to claim 5 having the name 7-[[1-[[(2-hydroxy-1-naphthyl)methyl]amino]cyclopent-1-yl]-carboxamido]cephalosporanic acid.

7. A compound according to claim 4 having the name 7-[[1-[[(2-hydroxy-1-naphthyl)methylene]amino]cyclopent-1-yl]-carboxamido]cephalosporanic acid.

8. A compound according to claim 3 having the name 7-[[1-[[(2-hydroxyphenyl)methyl]amino]cyclopent-1-yl]-carboxamido]desacetoxycephalosporanic acid.

* * * * *

UNITED STATES PATENT OFFICE
CERTIFICATE OF CORRECTION

Patent No. 3,887,546          Dated June 3, 1975

Inventor(s) B. K. Lee et al.

It is certified that error appears in the above-identified patent and that said Letters Patent are hereby corrected as shown below:

Col. 1, -- III -- should be inserted alongside the structure.

Col. 2, line 67, "boronydride" should read --borohydride--.

Col. 2, line 68, "boronydride" should read --borohydride--.

Col. 3, line 53, "AS" should read --As--.

Col. 5, --and-- should be inserted before the last structure.

Col. 6, line 19, "washing" should read --washings--.

Col. 7, line 30, "2butylbenzaldehyde" should read -- 2-butylbenzaldehyde --.

Col. 7, line 31, "te" should read --the--.

UNITED STATES PATENT OFFICE
CERTIFICATE OF CORRECTION

Patent No. 3,887,546      Dated June 3, 1975

Inventor(s)    Bong K. Lee et al.      PAGE - 2

It is certified that error appears in the above-identified patent and that said Letters Patent are hereby corrected as shown below:

Column 12, line 39, "$-N=CHR^1-NHCH_2R^1$" should read

-- $-N=CHR^1$ or $-NHCH_2R^1$ --.

Signed and Sealed this twenty-eight Day of October 1975

[SEAL]

Attest:

RUTH C. MASON
*Attesting Officer*

C. MARSHALL DANN
*Commissioner of Patents and Trademarks*